(12) United States Patent
Hagiwara et al.

(10) Patent No.: US 9,415,688 B2
(45) Date of Patent: Aug. 16, 2016

(54) VEHICULAR DISPLAY UNIT

(71) Applicant: YAZAKI CORPORATION, Minato-ku, Tokyo (JP)

(72) Inventors: Shigeru Hagiwara, Shimada (JP); Shigeki Totsuka, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/656,077

(22) Filed: Oct. 19, 2012

(65) Prior Publication Data
US 2013/0099912 A1 Apr. 25, 2013

(30) Foreign Application Priority Data

Oct. 20, 2011 (JP) .................................. 2011-230656
Nov. 25, 2011 (JP) .................................. 2011-257304

(51) Int. Cl.
*B60Q 1/00* (2006.01)
*B60K 37/04* (2006.01)
*B60K 35/00* (2006.01)

(52) U.S. Cl.
CPC ................. *B60K 37/04* (2013.01); *B60K 35/00* (2013.01); *B60K 2350/106* (2013.01); *B60K 2350/405* (2013.01); *B60K 2350/941* (2013.01); *B60K 2350/965* (2013.01)

(58) Field of Classification Search
USPC .............. 340/438, 468, 3.1; 700/112; 221/75; 116/28 R
See application file for complete search history.

(56) References Cited

U.S. PATENT DOCUMENTS

| 2,151,943 | A | * | 3/1939 | Sievers | ............................ 99/549 |
| 3,901,107 | A | * | 8/1975 | Halls | ................................ 81/170 |
| 4,566,399 | A | * | 1/1986 | Hildebrand et al. | ......... 116/28 R |
| 5,469,298 | A | * | 11/1995 | Suman et al. | .................. 359/630 |
| 5,751,576 | A | * | 5/1998 | Monson | ............................ 700/83 |
| 5,963,280 | A | * | 10/1999 | Okuda et al. | .................... 349/65 |
| 7,283,886 | B1 | * | 10/2007 | Bowman | ....................... 700/112 |
| 2001/0004164 | A1 | * | 6/2001 | Mattsson | .................. 297/284.11 |
| 2002/0070852 | A1 | | 6/2002 | Trauner et al. | |

(Continued)

FOREIGN PATENT DOCUMENTS

DE    102008004970 A1    7/2009
JP      3-28028 A          2/1991

(Continued)

OTHER PUBLICATIONS

Communication dated Jul. 7, 2015 from the Japanese Patent Office in counterpart application No. 2011-257304.

(Continued)

*Primary Examiner* — Fekadeselassie Girma
*Assistant Examiner* — Chico A Foxx
(74) *Attorney, Agent, or Firm* — Sughrue Mion, PLLC (57) ABSTRACT

A vehicular display unit includes: a main display disposed in a forward position of a driver and adapted to display vehicle information; an external display, other than the main display, disposed in the forward position of the driver, adapted to display vehicle information and having a screen functioning as an operation portion; and a display mover mechanism including a gear belt disposed on a circumferential track and configured to move the external display in a vehicle forward-rearward direction by a circumferential movement of the gear belt, and a gear mechanism configured to transmit a driving force of a driving source to the gear belt.

7 Claims, 9 Drawing Sheets

(56) References Cited

U.S. PATENT DOCUMENTS

| | | | |
|---|---|---|---|
| 2003/0006241 A1* | 1/2003 | Johnson | 221/75 |
| 2009/0066474 A1* | 3/2009 | Kawachi et al. | 340/3.1 |
| 2013/0141250 A1* | 6/2013 | Mathieu et al. | 340/901 |
| 2014/0285666 A1* | 9/2014 | O'Connell et al. | 348/148 |

FOREIGN PATENT DOCUMENTS

| | | |
|---|---|---|
| JP | 811582 A | 1/1996 |
| JP | 916891 A | 1/1997 |
| JP | 09-196690 A | 7/1997 |
| JP | 2005-28982 A | 2/2005 |
| JP | 2005-96624 A | 4/2005 |
| JP | 2006267064 A | 10/2006 |
| JP | 2006329410 A | 12/2006 |
| JP | 2007326491 A | 12/2007 |
| JP | 2008-001120 A | 1/2008 |
| JP | 2008-280037 A | 11/2008 |
| JP | 2008302715 A | 12/2008 |
| JP | 2009-127240 A | 6/2009 |
| JP | 2009120070 A | 6/2009 |

OTHER PUBLICATIONS

Communication dated Oct. 6, 2015 from the Japanese Patent Office issued in corresponding Japanese application No. 2011-230656.
Communication dated Nov. 17, 2015 from the Japanese Patent Office issued in corresponding Japanese application No. 2011-257304.
Communication dated Mar. 22, 2016, issued by the Japan Patent Office in counterpart Japanese Application No. 2011-230623.

* cited by examiner

VEHICULAR DISPLAY UNIT

BACKGROUND OF THE INVENTION

1. Field of the Invention

The present invention relates to a vehicular display unit disposed in a forward position of a driver.

2. Description of the Related Art

Figure 1:
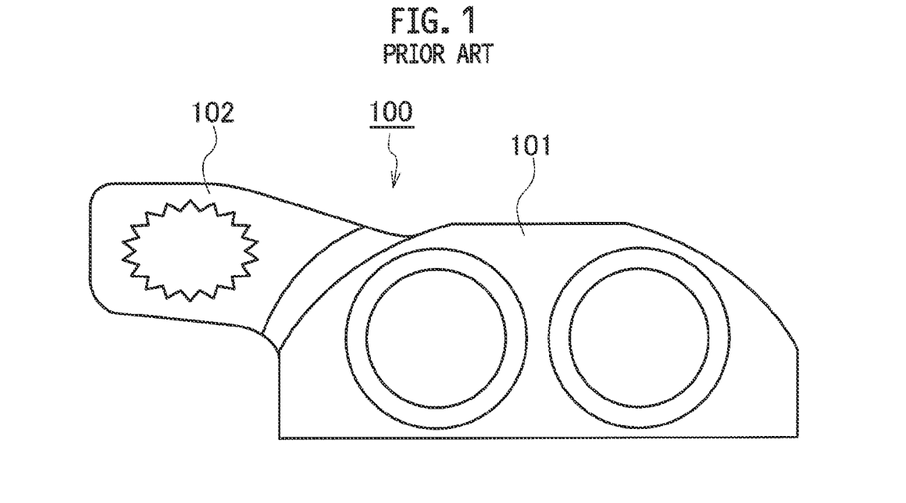
FIG. 1 is a perspective view of a vehicular display unit according to a conventional example.

This type of vehicular display unit displays various kinds of vehicle information (travel speed information, various kinds of alarm information, and the like), and the amount of display information is increasing year after year. For meeting the above requirement, a vehicular display unit provided with a plurality of displays has been conventionally proposed (refer to JP 9-196690 A and JP 2008-00120 A). FIG. 1 illustrates a conventional example of this type of vehicular display unit.

In FIG. 1, a conventional vehicular display unit 100 is provided with a main display 101 for displaying the travel speed and the like and an external display 102 which is another display disposed close to the main display 101. The external display 102 is fixed to the main display 101. The external display 102 displays the vehicle information which cannot be displayed only by the main display 101. Herein, it is preferable to provide an operation portion (such as a touch panel method) for implementing display contents change and the like since the operation portion contributes to increase of the amount of display information, improvement of functionality, improvement of usability, and the like.

SUMMARY OF THE INVENTION

However, taking the visibility to the driver into account, it is necessary to dispose the vehicular display unit 100 in the forward position of the driver; therefore, providing the external display 102 with the operation portion causes the following inconvenience.

That is, for prioritizing the visibility to the driver, it is desirable to dispose the external display 102 in a position as far as possible from the driver (a position on the vehicular forward side). However, this makes it difficult for the driver to operate the operation portion of the external display 102. On the other hand, for prioritizing the operability by the driver to operate the operation portion, it is desirable to provide the external display 102 as close as possible to the driver (a position in the vehicular rearward side). In this case, however, the visibility to the driver is deteriorated.

For solving the above inconvenience, it is therefore an object of the present invention to provide a vehicular display unit having a first display and a second display and capable of having a compatibility between the visibility to the driver and the operability by the driver.

According to a first aspect of the present invention, a vehicular display unit includes: a first display disposed in a forward position of a driver and adapted to display vehicle information; a second display, other than the first display, disposed in the forward position of the driver, adapted to display vehicle information and having an operation portion; and a display mover mechanism including a gear belt disposed on a circumferential track and configured to move the second display in a vehicle forward-rearward direction by a circumferential movement of the gear belt, and a gear mechanism configured to transmit a driving force of a driving source to the gear belt.

It is preferable that the vehicular display unit further includes a stopper mechanism including a lock portion meshable with a gear portion of the gear belt, and a lock portion moving unit configured to move the lock portion to a lock position where the lock portion is meshed with the gear portion of the gear belt and an unlock position where the lock portion is not meshed with the gear portion of the gear belt.

It is preferable that the display mover mechanism is received in a case, and the case includes a slide slit where a support portion of the second display moves following the movement of the gear belt, a shield sheet adapted to move in the case following the moving of the support portion while keeping the slide slit blocked, and a sheet guide portion configured to guide the shield sheet such that the shield sheet moves following a predetermined path.

With the vehicular display unit according to the first aspect of the present invention, when the operation portion of the second display is not operated, the second display is disposed in the position far away from the driver to thereby make it possible to secure the visibility to the driver; while when the operation portion of the second display is operated, the second display is disposed in the position close to the driver to thereby make it possible to secure of the operability by the driver; thus making it possible to have the visibility to the driver and the operability by the driver compatible with each other. Further, the drive force from the driving source is transmitted to the gear belt by the meshing of the transmitting parts, thus making it possible to accomplish a reliable operation. The gear belt is installed on the circumferential track, thus making it possible to lessen the space for installing the display mover mechanism.

According to a second aspect of the present invention, a vehicular display unit includes: a first display disposed in a forward position of a driver and adapted to display vehicle information; a second display, other than the first display, disposed in the forward position of the driver, adapted to display vehicle information and having an operation portion; a display mover mechanism for moving the second display in a vehicle forward-rearward direction; and a display guide portion for guiding the moving of the second display. The display guide portion includes: a guide member provided on a fix side and disposed in the vehicle forward-rearward direction; and a main slide portion and one or more sub-slide portions, which are provided at the second display and guided by the guide member. The main slide portion is disposed in a direction corresponding to a rotational moment by an own weight of the second display. The sub-slide portion is so disposed in a direction different from the direction of the main slide portion as to correspond to the rotational moment.

It is preferable that the sub-slide portions are disposed at two portions, and the sub-slide portions at the two portions are disposed in positions substantially opposed to each other.

It is preferable that the second display is disposed on a side face of the first display, a support portion of the second display is inserted into the first display from a slide slit on the side face of the first display, and a display mover mechanism and the display guide portion are received in the first display.

With the vehicular display unit according to the second aspect of the present invention, when the operation portion of the second display is not operated, the second display is positioned in the position far away from the driver to thereby make it possible to secure the visibility to the driver; while when the operation portion of the second display is operated, the second display is positioned in the position close to the driver to thereby make it possible to secure the operability by the driver; thus making it possible to have the visibility to the driver and the operability by the driver compatible with each other.

Further, the display guide portion can securely restrict a rotation of the second display attributable to a rotational moment since the main slide portion mainly receives a load by the rotational moment attributable to the own weight of the second display and the sub-slide portions receive the load by the rotational moment in the direction different from the direction of the rotational moment of the main slide portion. By this, for example, even in a case that the vehicular display unit is positioned in such a position that the rotational moment by the own weight of the second display acts on the display guide portion, the second display can be reliably and smoothly moved. Further, the positional relation between the second display, the display guide portion and the display mover mechanism can be arbitrarily set, thus making it possible to save the space of the vehicular display unit.

DESCRIPTION OF THE EMBODIMENTS

Hereinafter, embodiments of the present invention will be explained based on drawings.

First Embodiment

FIGS. 2 to 6 illustrate a first embodiment of the present invention.

Figure 2:
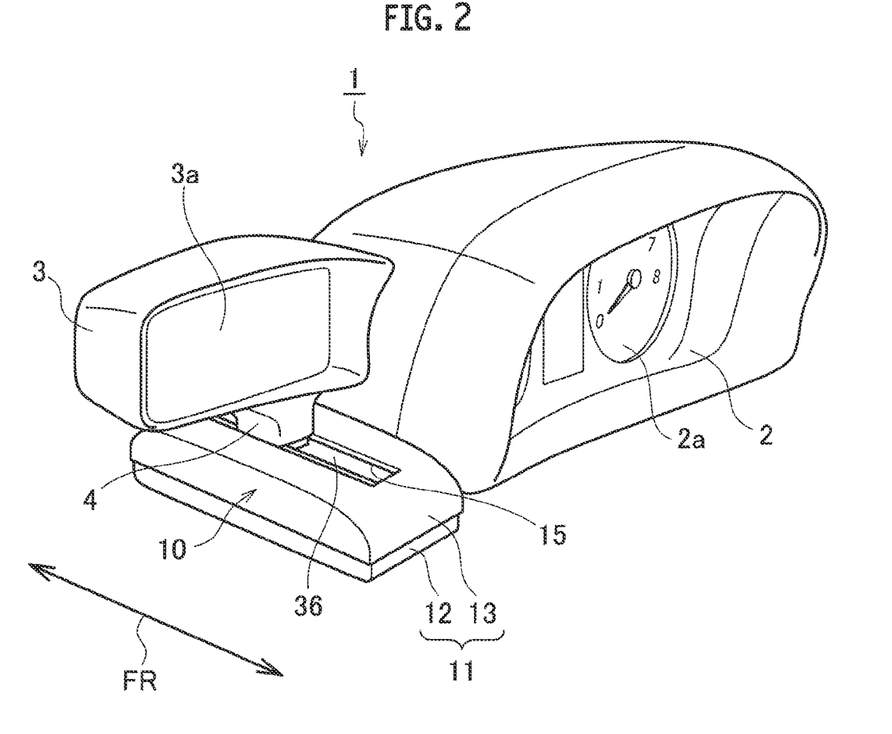
FIG. 2 is a perspective view of a vehicular display unit according to a first embodiment.

A vehicular display unit 1 according to the first embodiment is disposed at an instrument panel (not illustrated) in a forward position of a driver. The vehicular display unit 1 includes a main display 2 as a first display for displaying vehicle information, an external display 3 as a second display for displaying supplemental information unable to be displayed by the main display 2, and a display mover mechanism 10 for moving the external display 3 in a vehicle forward-rearward direction FR.

The main display 2 includes a speed meter (not illustrated) for displaying a travel speed as vehicle information, a tachometer 2a for displaying a rotation speed of a engine as vehicle information, a fuel meter (not illustrated), and the like.

The external display 3 is provided to be separated from the main display 2. The external display 3 is disposed immediately on the left of the main display 2. The external display 3 includes a liquid crystal display. A screen 3a of the liquid crystal display has a touch panel function, functioning as an operation portion in a touch panel display mode.

Figure 3:
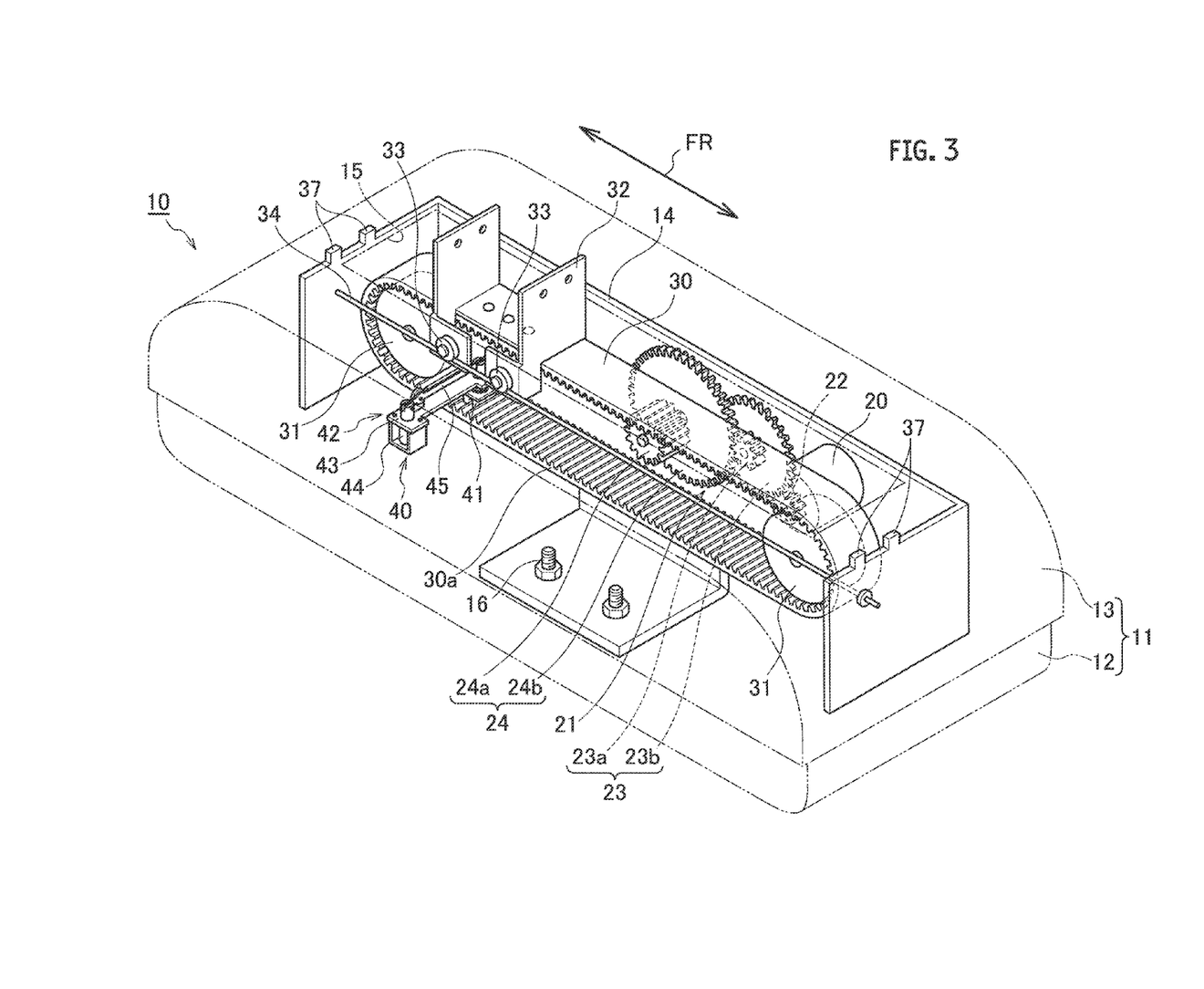
FIG. 3 is a transparent perspective view of a display mover mechanism in the vehicular display unit according to the first embodiment.
Figure 4:
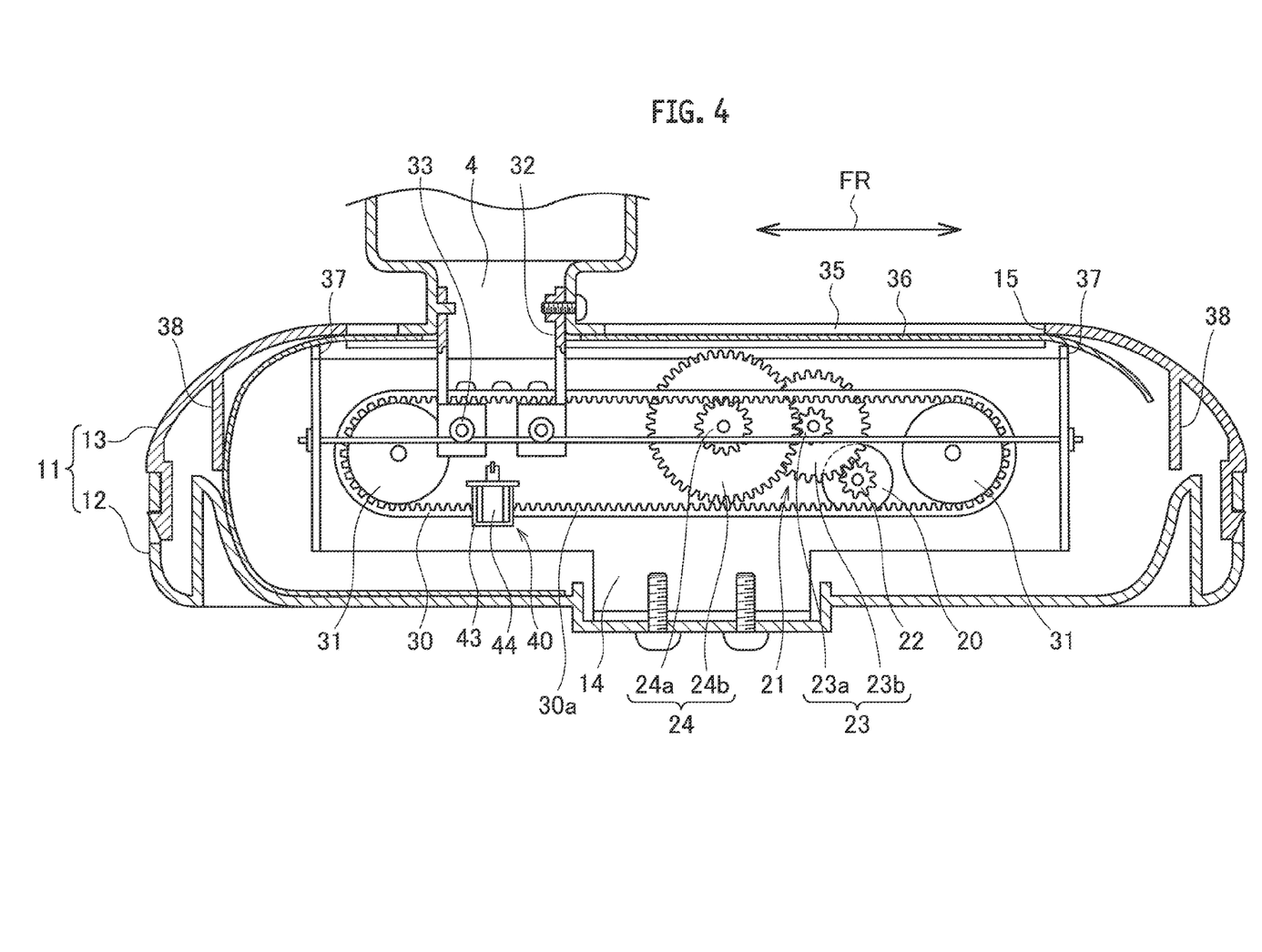
FIG. 4 is a cross sectional view of the display mover mechanism in the vehicular display unit according to the first embodiment.

The display mover mechanism 10 includes a case 11, a first mounting stay 14 disposed in the case 11. Further, the display mover mechanism 10 includes a motor 20 as a driving source, a gear mechanism 21, a gear belt 30, and a stopper mechanism 40, which are received in the case 11. The case 11 includes a lower case portion 12 and an upper case portion 13 assembled to the lower case portion 12. The lower case portion 12 is fixed to an upper face of the instrument panel (not illustrated). A slide slit 15 which is long in the vehicle forward-rearward direction FR is opened in an upper face of the upper case portion 13.

The first mounting stay 14 is fixed to the lower case portion 12 with screws 16.

The motor 20 is a step motor. The gear mechanism 21 includes a small gear 22 fixed to a rotational shaft of the motor 20, a middle gear 23 meshed with the small gear 22, and a drive gear 24 meshed with the middle gear 23. The motor 20 is fixed to the first mounting stay 14. The middle gear 23 is integrated with a small diameter toothed part 23a and a large diameter toothed part 23b. The drive gear 24 includes a small diameter toothed part 24a and a large diameter toothed part 24b, integrally. The middle gear 23 and the drive gear 24 are each rotatably supported to the first mounting stay 14. The gear mechanism 21 having the above group of the small gear 22, the middle gear 23, and the drive gear 24 decreases a rotation speed of the motor 20 and outputs the decreased rotation speed to the gear belt 30.

The gear belt 30 produced in an endless is formed, for example, of a hard rubber. The gear belt 30 is provided with gear portions 30a around the entire circumference on an inner peripheral side. The gear belt 30 bridges over a pair of rollers 31 disposed at an interval in the vehicle forward-rearward direction FR. By this structure, the gear belt 30 is disposed on a circumferential track and moves along the circumferential track. Each of the rollers 31 is rotatably supported to the first mounting stay 14.

In an upper face portion of the circumferential track of the gear belt 30, support brackets 32 are fixed to the gear belt 30 by welding or the like. The gear belt 30 and the support brackets 32 may be integrally formed. A support portion 4 of the external display 3 inserted from the slide slit 15 is fixed to the support brackets 32. Guide rollers 33 are rotatably supported to two portions below respective ends of the support brackets 32. Each of the guide rollers 33 is put on a guide rod 34 installed to the first mounting stay 14. By the above structure, the support brackets 32 can smoothly move integrally with the gear belt 30 along with the movement of the gear belt 30 while supporting a load of the external display 3.

Figure 6:
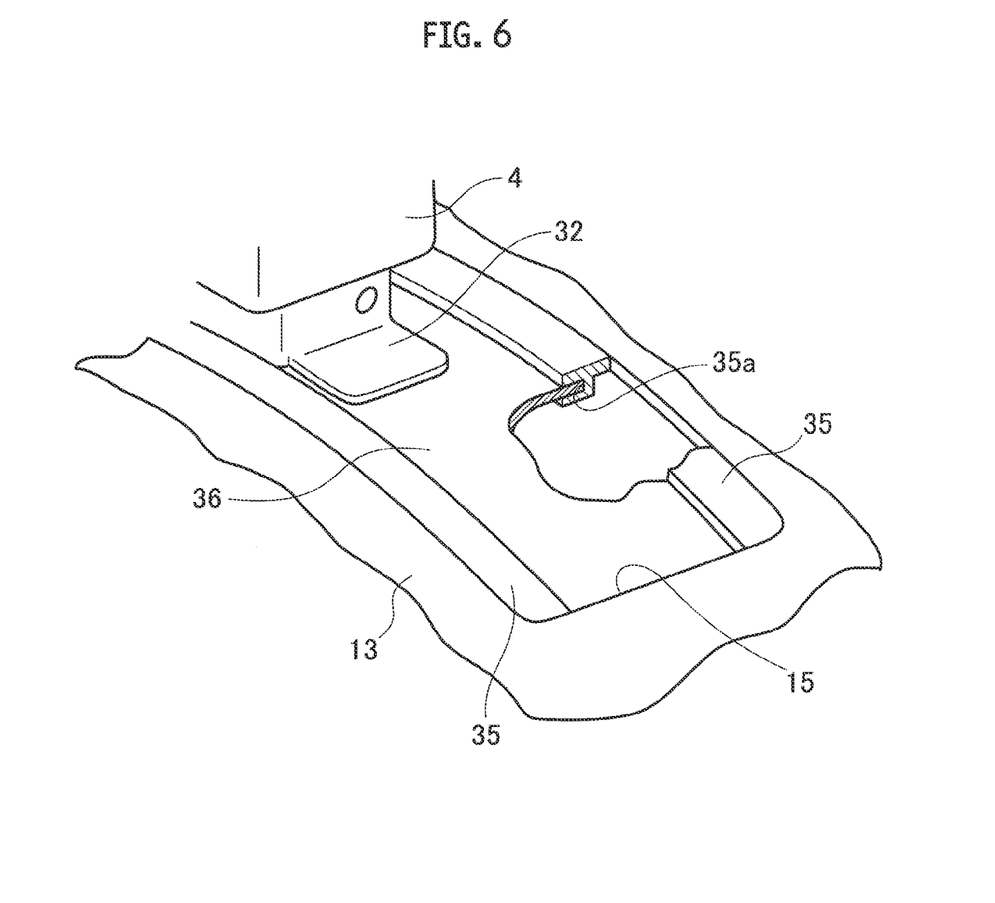
FIG. 6 is a perspective view around a slide slit of a case in the vehicular display unit according to the first embodiment.

In the upper case portion 13, as illustrated in FIGS. 4 and 6, sheet slide guide portions 35 as a pair of sheet guide portions are fixed along respective side faces of the slide slit 15. The sheet slide guide portions 35 have such a structure that, in a longitudinal direction of the slide slit 15, sheet insert grooves 35a are formed in positions opposing each other.

A shield sheet 36 through which the support portion 4 penetrates is fixed to the support bracket 32. The shield sheet 36 is a flexible, long and flat member. The shield sheet 36 has side ends respectively inserted to the sheet insert grooves 35a of the sheet slide guide portions 35 and so disposed as to block the slide slit 15. By this structure, the shield sheet 36 moves integrally with the support portion 4 while blocking the slide slit 15. The shield sheet 36 has respective end sides (in the movement direction) entering in the case 11. In the case 11 and immediately below respective ends in the longitudinal direction of the slide slit 15, there are provided sheet receiving portions 37 as a pair of sheet guide portions. The pair of sheet receiving portions 37 are provided to be integrated with the first mounting stay 14 and restrict a downward hanging of the shield sheet 36. In the case 11 and in positions over respective ends in the longitudinal direction of the slide slit 15, there are provided sheet bending guide portions 38 as a pair of sheet guide portions extending in a vertical direction. The pair of sheet bending guide portions 38 are provided to be integrated with the upper case portion 13, and forcibly bend the respective end sides of the shield sheet 36, to thereby restrict, by using a redundant space in the case 11, the shield sheet 36 such that the shield sheet 36 smoothly moves.

Figure 5:
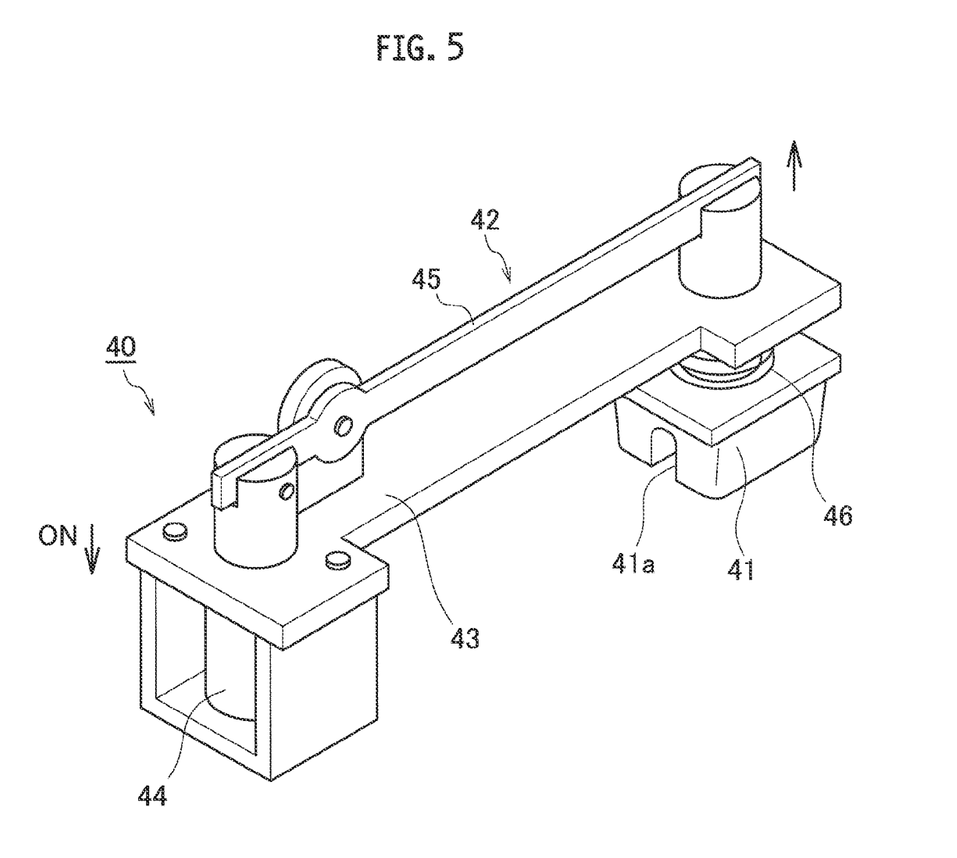
FIG. 5 is a perspective view of a stopper mechanism in the vehicular display unit according to the first embodiment.

The stopper mechanism 40, as illustrated in FIG. 5, includes a lock portion 41 having a gear mesh portion 41a meshable with the gear portions 30a of the gear belt 30 and a lock portion moving unit 42 for moving the lock portion 41 to a lock position where the gear mesh portion 41a is meshed with the gear portions 30a of the gear belt 30 and to an unlock position where the gear mesh portion 41a is not meshed with the gear portions 30a of the gear belt 30. The gear mesh portion 41a is in a form of being meshable with one of the gear portions 30a of the gear belt 30. Further, the gear mesh portion 41a may be in such a form that the gear mesh portion 41a can be meshed with two or more gear portions 30a of the gear belt 30.

The lock portion moving unit 42 includes a solenoid 44 fixed to a second mounting stay 43 and a link rod 45 having a first end connected to an output rod of the solenoid 44 and a second end connected with the lock portion 41. In a position close to the first end of the link rod 45, the link rod 45 is rotatably supported to the second mounting stay 43. A spring 46 is intervened between the lock portion 41 and the second mounting stay 43. An elastic force of the spring 46 biases the lock portion 41 to a lock position side on which the gear mesh portion 41a is meshed with the gear portions 30a of the gear belt 30. When the solenoid 44 is turned off (not energized), the elastic force of the spring 46 positions the lock portion 41 to the lock position. When the solenoid 44 is turned on (energized), the lock portion 41 is positioned to the unlock position against the elastic force of the spring 46.

In the above structure, when a request for moving the external display 3 is outputted by an external switch (not illustrated) or the like, the solenoid 44 of the stopper mechanism 40 is turned on under a predetermined condition, to thereby unlock the gear belt 30. Then, the motor 20 is rotated. The rotation of the motor 20 is transmitted to the gear belt 30 by way of the gear mechanism 21, to thereby move the gear belt 30 on the circumferential track. Following this movement of the gear belt 30, the external display 3 moves in the vehicle forward-rearward direction FR. After the movement of the external display 3, the solenoid 44 of the stopper mechanism 40 is turned off, to thereby lock the gear belt 30.

Thus, when the screen 3a of the external display 3 is not operated as the operation portion, the external display 3 is disposed in the position far away from the driver (the position on the vehicular forward side) to thereby make it possible to secure the visibility to the driver. Further, when the screen 3a of the external display 3 is operated as the operation portion, the external display 3 is disposed in the position close to the driver (the position on the vehicular rearward side) to thereby make it possible to secure of the operability by the driver.

As explained above, the vehicular display unit 1 according to the first embodiment capable of moving the external display 3 in the vehicle forward-rearward direction FR can accomplish the compatibility between the visibility to the driver and the operability by the driver.

The display mover mechanism 10 includes the gear belt 30 disposed on the circumferential track and the gear mechanism 21 for transmitting the drive force of the motor 20 to the gear belt 30, to thereby move the external display 3 in the vehicle forward-rearward direction FR by the circumferential movement of the gear belt 30. Thus, the drive force from the motor 20 is transmitted to the gear belt 30 by the gear mechanism 21, that is, the meshing of the transmitting parts, thus making it possible to accomplish a reliable operation. The gear belt 30 is installed on the circumferential track, thus making it possible to lessen the space for installing the display mover mechanism 10.

The display mover mechanism 10 includes the stopper mechanism 40 including the lock portion 41 having the gear mesh portion 41a meshable with the gear portions 30a of the gear belt 30 and the lock portion moving unit 42 for moving the lock portion 41 to the lock position where the gear mesh portion 41a is meshed with the gear portions 30a of the gear belt 30 and the unlock position where the gear mesh portion 41a is not meshed with the gear portions 30a of the gear belt 30. This makes it possible to fix the external display 3 safely and reliably to the predetermined position. Further, the lock portion 41 is set to the lock position when the solenoid 44 is turned off, thus making it possible to save the electric power.

The display mover mechanism 10 is received in the case 11. The case 11 is provided with the slide slit 15 where the support portion 4 of the external display 3 moves following the movement of the gear belt 30. Further, the case 11 is provided with the shield sheet 36 adapted to move in the case 11 following the movement of the support portion 4 while holding the state of blocking the slide slit 15. Still further, the case 11 is provided with the sheet slide guide portion 35, sheet receiving portion 37 and sheet bending guide portion 38 for guiding the shield sheet 36 such that the shield sheet 36 moves following the predetermined path. Thus, the shield sheet 36 reliably prevents entry of dust, foreign matter, water, and the like into the case 11 from the slide slit 15. That is, excellent dust-proof and water-proof are accomplished. The shield sheet 36 makes the inside of the slide slit 15 invisible, thus accomplishing a good appearance. Further, the shield sheet 36 moves along the predetermined track in the case 11 by allowing the sheet slide guide portion 35 to guide the slide slit 15 and allowing the pair of sheet receiving portions 37 and the pair of sheet bending guide portions 38 to guide the respective end sides of the shield sheet 36 entering into the case 11, to thereby make it possible to smoothly move the shield sheet 36.

According to the first embodiment, though including the screen 3a having the touch panel function, the operation portion of the external display 3 may be one having a mechanical structure.

According to the first embodiment, though being fixed to the support bracket 32, the shield sheet 36 may be fixed to the support portion 4 of the external display 3.

According to the first embodiment, though being a member separated from the upper case portion 13, the sheet slide guide portion 35 may be integrated with the upper case portion 13.

According to the first embodiment, the sheet guide portion includes the sheet slide guide portion 35, the sheet receiving portion 37 and the sheet bending guide portion 38. However, various structures can be conceived as the sheet guide portion provided that such structures accomplish that guiding respective end sides of the shield sheet 36 entering into the case 11 can move the shield sheet 36 along the predetermined movement track.

According to the first embodiment, though being disposed in one position, the external display 3 as the second display may be disposed separately in a plurality of portions. Further, a part or an entirety of the plurality of portions may be provided to be moveable.

Second Embodiment

FIGS. 7 to 11 illustrate a second embodiment of the present invention.

Figure 7:
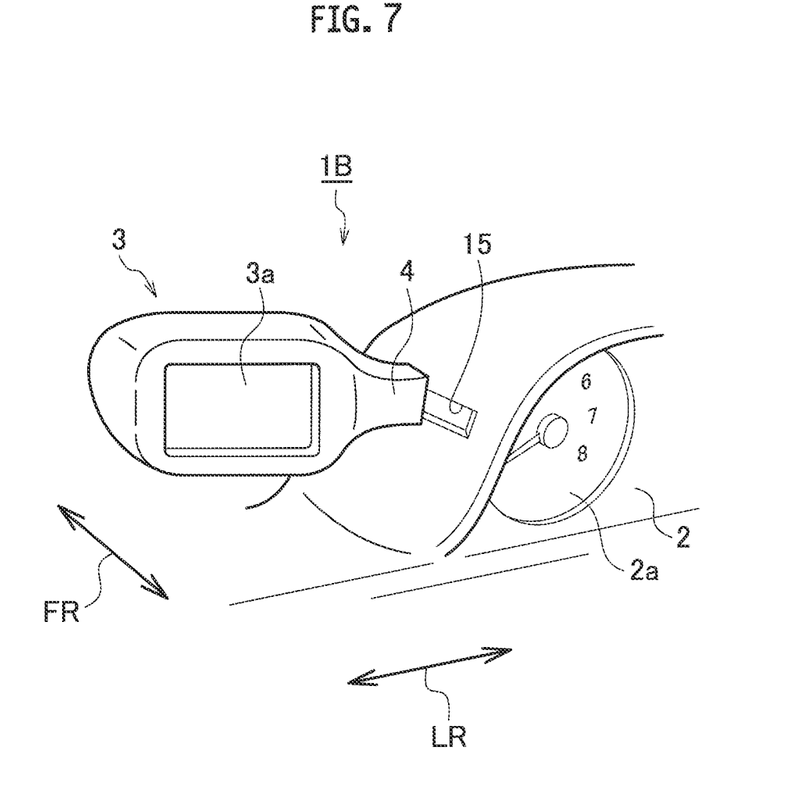
FIG. 7 is a perspective view of a vehicular display unit according to a second embodiment.

A vehicular display unit 1B according to the second embodiment is disposed at an instrument panel (not illustrated) in the forward position of the driver. The vehicular display unit 1B includes a main display 2 as a first display for displaying the vehicle information, an external display 3 as a second display for displaying the supplemental information unable to be displayed by the main display 2, a display mover mechanism 10 for moving the external display 3 in a vehicle forward-rearward direction FR, and a display guide portion 5 for guiding the movement of the external display 3.

The main display 2 includes the speed meter (not illustrated) for displaying a travel speed as vehicle information, the tachometer 2a for displaying a rotation speed of a engine as vehicle information, the fuel meter (not illustrated), and the like.

A slide slit 15 extending long in a vehicle forward-rearward direction FR is opened on a side face of the main display 2.

The external display 3 is provided to be separated from the main display 2. The external display 3 is disposed immediately on the left of the main display 2, that is, close to the main display 2 in a vehicle lateral direction LR. The external display 3 includes a liquid crystal display. The screen 3a of the liquid crystal display has a touch panel function, and is switchable between a touch panel display mode capable of making a touch panel operation and an ordinary display mode incapable of making the touch panel operation. That is, the screen 3a of the liquid crystal display functions as the operation portion in the touch panel display mode.

The external display 3 has the support portion 4. The support portion 4 is so provided to sandwich the screen 3a of the liquid crystal display from both sides in the upper-lower direction, and includes a first frame member 47 and a second frame member 48 each extending in the direction of the main display 2 (rightward in FIG. 8) and a third frame member 49 connecting the area between the first frame member 47 and the second frame member 48 on the way. A distal end side of the support portion 4 is inserted into the main display 2 from the slide slit 15.

Figure 8:
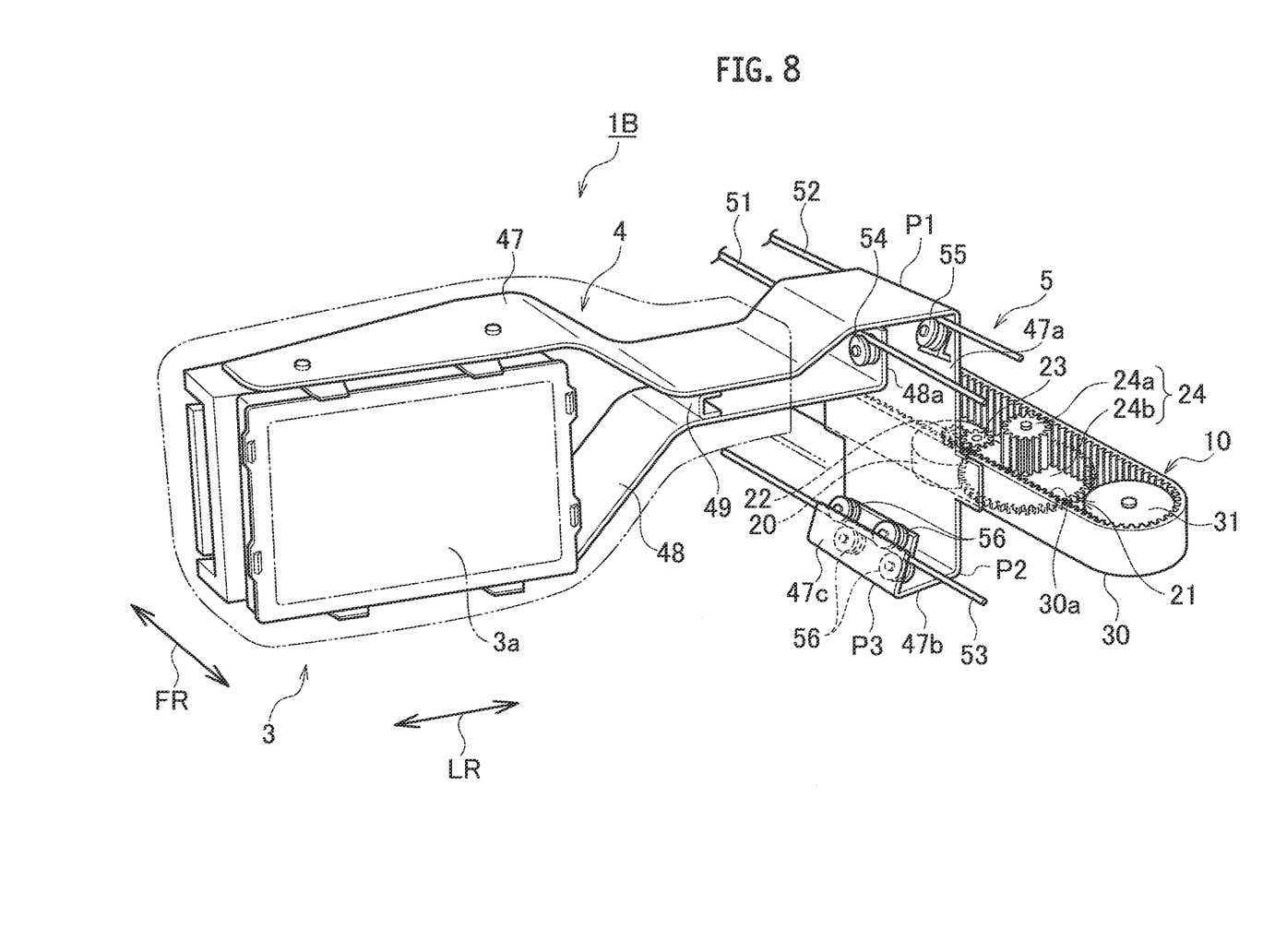
FIG. 8 is a perspective view of a display mover mechanism and a display guide portion in the vehicular display unit according to the second embodiment.

The display guide portion 5 is disposed in the main display 2. The display guide portion 5 includes a first guide rod 51, a second guide rod 52, and a third guide rod 53, which are a plurality of guide members fixed to a housing of the main display 2 as a fix side and extending in the vehicle forward-rearward direction FR. The display guide portion 5 includes first guide rollers 54, second guide rollers 55, and third guide rollers 56, each provided at the support portion 4 of the external display 3. The first guide rollers 54 are served as a main slide portion and are guided by the first guide first guide rod 51. The second guide rollers 55 are served as sub-slide portions and are guided by the second guide rod 52. The third guide rollers 56 are served as sub-slide portions and are guided by the third guide rod 53.

The first guide rod 51 is disposed in a position which is as high as an upper end of the screen 3a and closer to the screen 3a than a distal end portion 48a of the second frame member 48.

The second guide rod 52 is disposed in a position which is as high as the upper end of the screen 3a and closer to the display mover mechanism 10 than the first guide rod 51.

The third guide rod 53 is disposed in a position which is as high as a lower end of the screen 3a and in a middle position between the first guide rod 51 and the second guide rod 52 in the vehicle lateral direction LR.

The first frame member 47 includes a side plate portion 47a hanging downward from a bend portion P1 closer to the display mover mechanism 10 than the second guide rod 52, a lower plate portion 47b extending in a direction of the screen 3a from a bend portion P2 below the third guide rod 53, and a distal end portion 47c extending in a direction of the second guide rod 52 from a bend portion P3 closer to the screen 3a than the third guide rod 53. By this structure, the first frame member 47 has such a cross section of a part (close to the display mover mechanism 10) in a form of a substantially U-like shape.

The first guide rod 51 and the first guide rollers 54 are disposed between the first frame member 47 and the second frame member 48. Each of the first guide rollers 54 includes a support shaft 54a extending in the vehicle lateral direction LR and having a first end fixed to the distal end portion 48a of the second frame member 48. Each of the first guide rollers 54 is disposed immediately below the first guide rod 51. Each of the first guide rollers 54 is disposed in a direction corresponding to a rotational moment attributable to an own weight of the external display 3.

That is, since the own weight of the external display 3 disposed immediately on the left of the main display 2 is applied to the support portion 4, the rotational moment acts on the first to third frame members 47 to 49 of the support portion 4 with the slide slit 15 (into which the support portion 4 is inserted and defined on the side face of the main display 2) as a rotational center. Each of the first guide rollers 54 is set in a vertical direction which is optimum for effectively receiving a load (arrow A1 in FIG. 9) by the rotational moment attributable to the own weight of the external display 3. Thus, each of the first guide rollers 54 mainly receives the load (arrow A1 in FIG. 9) by the rotational moment attributable to the own weight of the external display 3.

The second guide rod 52 and the second guide rollers 55 are provided inside and close to the bend portion P1 of the first frame member 47. Each of the second guide rollers 55 includes a support shaft 55b extending in a direction inclined clockwise in FIG. 9 relative to the vehicle lateral direction LR and having a first end fixed to the side plate portion 47a of the first frame member 47 by way of a support bracket 55a. Each of the second guide rollers 55 in a state of being inclined relative to the vertical direction is disposed immediately below the second guide rod 52.

Figure 9:
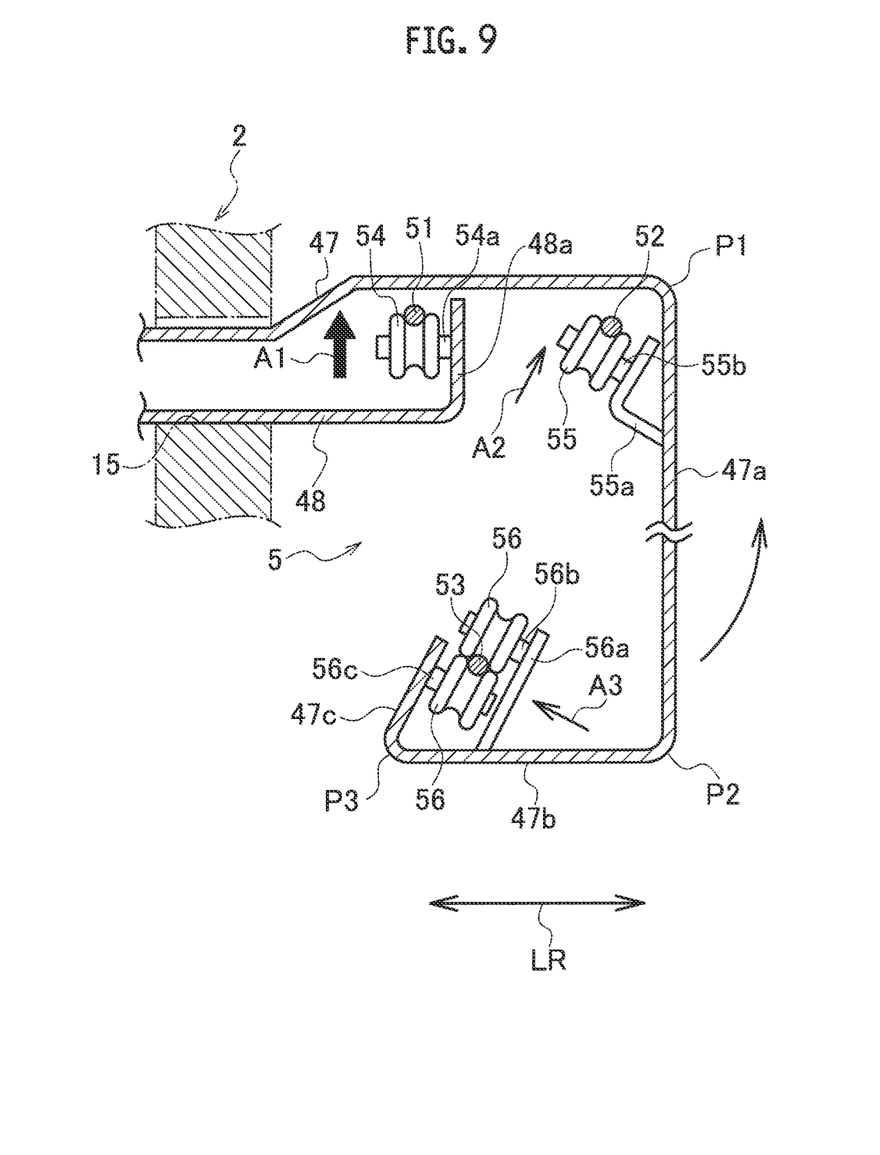
FIG. 9 is a cross sectional view of the display guide portion in the vehicular display unit according to the second embodiment.

The third guide rod 53 and four of the third guide rollers 56 are provided inside and close to the bend portion P3 of the first frame member 47. Like the second guide rollers 55, the third guide rollers 56 in a state of being inclined, to the same extent, relative to the vertical direction are disposed immediately on and below the third guide rod 53 alternately. Of these, the two upper third guide rollers 56 each have a support shaft 56b having a first end fixed to a lower plate portion 47b of the first frame member 47 by way of a support bracket 56a. Further, the two remaining lower third guide rollers 56 each have a support shaft 56c having a first end fixed to the distal end portion 47c of the first frame member 47. The support shafts 56b, 56c are disposed in parallel with each support shaft 55b of the second guide rollers 55.

That is, each of the second guide rollers 55 and each of the third guide rollers 56 are disposed in a direction inclined relative to the first guide rollers 54 (a direction different from the direction of the first guide rollers 54) and disposed in a position substantially opposed to each other. Specifically, it is so configured that the second guide rollers 55 can effectively receive a load in a direction of an arrow A2 in FIG. 9 and the third guide rollers 56 can effectively receive a load in a direction of an arrow A3 in FIG. 9. It is so configured that the second guide rollers 55 and the third guide rollers 56 can effectively receive the loads in the directions orthogonal to each other (the load in the direction of the arrow A2 in FIG. 9 and the load in the direction of the arrow A3 in FIG. 9).

The display mover mechanism 10 is received in the main display 2. The display mover mechanism 10 has a motor 20, a gear mechanism 21 and a gear belt 30.

The motor 20 is a step motor. The gear mechanism 21 includes a small gear 22 fixed to the rotational shaft of the motor 20, middle gear 23 meshed with the small gear 22, and a drive gear 24 meshed with the middle gear 23. The motor 20 is fixed to a bracket (not illustrated). The drive gear 24 includes a small diameter toothed part 24a and a large diameter toothed part 24b, integrally. The middle gear 23 and the drive gear 24 are rotatably supported to the bracket, respectively. The gear mechanism 21 including the above group of the small gear 22, the middle gear 23, and the drive gear 24 decreases a rotation speed of the motor 20 and outputs the decreased rotation speed to the gear belt 30.

The gear belt 30 produced in an endless is formed, for example, of a hard rubber. The gear belt 30 is provided with gear portions 30a around the entire circumference on the inner peripheral side. The gear belt 30 bridges over a pair of rollers 31 disposed at an interval in the vehicle forward-rearward direction FR. By this structure, the gear belt 30 is disposed on the circumferential track and moves along the circumferential track. Each of the rollers 31 is rotatably supported to the bracket.

The display mover mechanism 10 includes a stopper mechanism (not illustrated) for stopping the movement of the gear belt 30. The stopper mechanism is driven by a solenoid 44 (illustrated in FIG. 10).

The side plate portion 47a of the first frame member 47 is fixed to an upper face portion of the circumferential track of the gear belt 30 by welding or the like. The gear belt 30 and the side plate portion 47a may be formed integrally.

Figure 10:
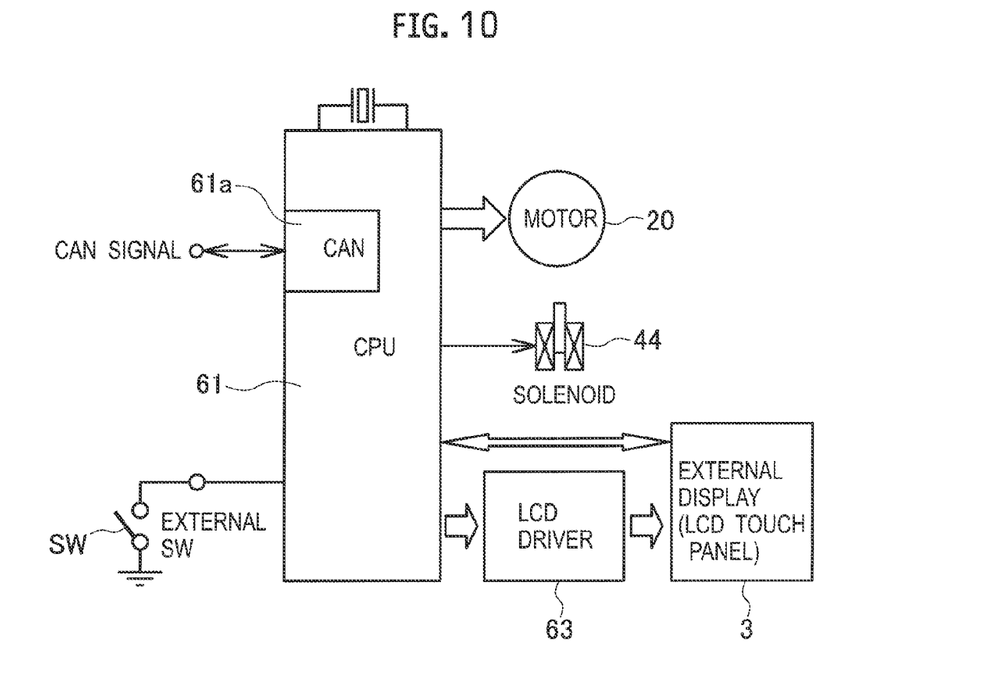
FIG. 10 is a control block diagram of the vehicular display unit according to the second embodiment.

Next, a control system of the vehicular display unit 1B will be explained. As illustrated in FIG. 10, a CAN (Control Area Network) signal or an operation (ON/OFF) signal of an external switch SW are inputted to a CPU (Central Processing Unit) 61 as a controller. The external switch SW is disposed in a position close to the driver for the driver to easily operate. The CPU 61 has a CAN signal processor 61a, thus processing the CAN signal. The CAN signal includes a signal of speed of the vehicle, a touch panel display request signal of the external display 3, and the like. From the signal of speed of the vehicle, the CPU 61 recognizes whether the vehicle is traveling or making a stop. The CPU 61 controls driving of each of the motor 20 of the display mover mechanism 10, the solenoid 44 of the stopper mechanism (not illustrated) and an LCD driver 63 of the external display 3. The CPU 61 can control a state of the screen 3a of the external display 3. For example, the CPU 61 can control switching between the touch panel display mode capable of making the touch panel operation and the ordinary display mode incapable of making the touch panel operation.

As explained above, the vehicular display unit 1B according to the second embodiment includes the main display 2, the external display 3 having the operable screen 3a, the display mover mechanism 10 for moving the external display 3 in the vehicle forward-rearward direction FR, and the display guide portion 5 for guiding the movement of the external display 3. Thus, when the screen 3a of the external display 3 is not operated, the external display 3 is positioned in the position far away from the driver to thereby make it possible to secure the visibility to the driver; while when the screen 3a of the external display 3 is operated, the external display 3 is positioned in the position close to the driver to thereby make it possible to secure the operability by the driver; thus making it possible to have the visibility to the driver and the operability by the driver compatible with each other.

The display guide portion 5 includes the first guide rod 51, the second guide rod 52, and the third guide rod 53, each provided at the main display 2 as the fix side and disposed in the vehicle forward-rearward direction FR. The display guide portion 5 includes the first guide rollers 54 guided by the first guide rod 51, the second guide rollers 55 guided by the second guide rod 52, and the third guide roller 56 guided by the third guide rod 54, each provided at the support portion 4 of the external display 3. The first guide rollers 54 are disposed in the direction corresponding to the rotational moment by the own weight of the external display 3. The second guide rollers 55 and the third guide rollers 56 are respectively so disposed in the direction inclined relative to the first guide rollers 54 (the direction different from the direction of the first guide rollers 54) as to correspond to the rotational moment. Specifically, it is so configured that the second guide rollers 55 can effectively receive the load in the direction of the arrow A2 in FIG. 9 and the third guide rollers 56 can effectively receive the load in the direction of the arrow A3 in FIG. 9. Thus, the first guide rollers 54 mainly receive the load by the rotational moment attributable to the own weight of the external display 3 and the second guide rollers 55 and the third guide rollers 56 respectively receive the load by the rotational moment in the direction different from the direction of the rotational moment of the first guide roller 54. Therefore, the display guide portion 5 can securely restrict a rotation of the external display 3 attributable to the rotational moment by the own weight of the external display 3.

By this, even in a case that the vehicular display unit 1B is positioned in such a position that the rotational moment by the own weight of the external display 3 acts on the display guide portion 5 (for example, according to the second embodiment), the external display 3 can be reliably and smoothly moved. Further, the positional relationship between the external display 3, the display guide portion 5, and the display mover mechanism 10 can be arbitrarily set, thus making it possible to save the space of the vehicular display unit 1B.

The second guide rollers 55 and the third guide rollers 56 are disposed in the positions substantially opposed to each other. Further, the second guide rollers 55 and the third guide rollers 56 can effectively receive the respective loads in the directions orthogonal to each other (the load in the direction of the arrow A2 in FIG. 9 and the load in the direction of the arrow A3 in FIG. 9), thus making it possible to effectively restrict the rotation of the external display 3.

Figure 11:
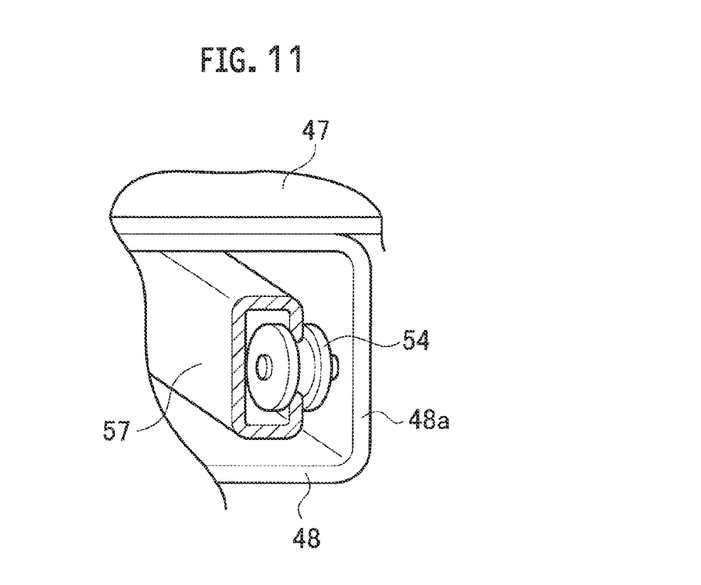
FIG. 11 is a perspective view of a modified example of the display guide portion in the vehicular display unit according to the second embodiment.

According to the second embodiment, the guide members include the first guide rod 51, the second guide rod 52, and the third guide rod 53. However, as illustrated in FIG. 11, the guide members may include a guide rail 57 formed, by a bending machining, into a reinforced configuration having a cross section of a substantially U-like shape. This configuration allows the guide rail 57 to receive a relatively large load, thus making it possible to support the external display 3 more reliably.

What is claimed is:

1. A vehicular display unit in a vehicle comprising:
a first display disposed in a forward position of a driver and adapted to display vehicle information;
a second display, other than the first display, disposed in the forward position of the driver, adapted to display vehicle information and having an operation portion for providing the driver with input interaction with the second display during operation of the second display;
a display mover mechanism comprising:
    a gear belt in an endless pass, disposed on a circumferential track, and configured to move the second display in a vehicle forward-rearward direction by a circumferential movement of the gear belt, and
    a gear mechanism configured to transmit a driving force of a driving source to the gear belt;
    a support bracket fixed to an outer surface of the gear belt, the second display fixed to the support bracket;
    a case receiving the display mover mechanism, the case being mounted on top of a dashboard of the vehicle next to the first display and
    a stopper mechanism, wherein the stopper mechanism includes a solenoid and a spring connected to a lock portion,
    wherein as a result of the solenoid being turned off, an elastic force of the spring positions the lock portion in a locked position to lock the gear belt in the circumferential track at a desired position,
    wherein as a result of the solenoid being turned on, the lock portion is positioned in an unlocked position against the elastic force of the spring to release the gear belt and to permit movement thereof,
    wherein the first display and the second display are aligned in a vehicle interior-exterior directions, and
    wherein the gear belt is located below the second display to cause a moving of the second display to be at a position close to the driver when the driver operates the second display and a position far away from the driver when the driver is not operating the second display to make it possible to secure the visibility to the driver during operation of the vehicle.

2. The vehicular display unit according to claim 1, wherein the lock portion is meshable with a gear portion of the gear belt, and
the stopper mechanism includes a lock portion moving unit configured to move the lock portion:
    to the lock position where the lock portion is meshed with the gear portion of the gear belt and to the unlock position where the lock portion is not meshed with the gear portion of the gear belt, to cause the gear belt to be locked at the desired position and permit movement of the gear belt, respectively.

3. The vehicular display unit according to claim 1, wherein the case comprises:
    a slide slit where a support portion of the second display moves following the movement of the gear belt,
    a shield sheet adapted to move in the case following the moving of the support portion while keeping the slide slit blocked, and
    a sheet guide portion configured to guide the shield sheet such that the shield sheet moves following a predetermined path.

4. The vehicular display unit according to claim 1, wherein the second display has the support portion configured to frame a screen of the second display and configured to be fixed to the support bracket.

5. A vehicular display unit in a vehicle comprising:
a first display disposed in a forward position of a driver and adapted to display vehicle information;
a second display, other than the first display, disposed in the forward position of the driver, adapted to display vehicle information and having an operation portion for providing the driver with input interaction with the second display during operation of the second display;
a gear belt in an endless pass, disposed on a circumferential track, and configured to move the second display in the vehicle forward-rearward direction by a circumferential movement of the gear belt, and
    a display guide portion for guiding the moving of the second display, the display guide portion comprising:
    a guide member provided on a fix side and disposed in the vehicle forward-rearward direction, and
    a main slide portion and one or more sub-slide portions, which are provided at the second display and guided by the guide member, the main slide portion disposed in a direction corresponding to a rotational moment by an own weight of the second display, the sub-slide portions so disposed in a direction different from the direction of the main slide portion as to correspond to the rotational moment,
wherein stopper a solenoid-and-spring connected to a lock portion,
wherein as a result of the solenoid being turned off, an elastic force of the spring positions the lock portion in a locked position to lock the gear belt in the circumferential track at a desired position,
wherein as a result of the solenoid being turned on, the lock portion is positioned in an unlocked position against the elastic force of the spring to release the gear belt and to permit movement thereof,
    wherein the first display and the second display are aligned in a vehicle interior-exterior directions, and
    wherein the gear belt is located below the second display to cause a moving of the second display to be at a position close to the driver when the driver operates the second display and a position far away from the driver when the driver is not operating the second display to make it possible to secure the visibility to the driver during operation of the vehicle.

6. The vehicular display unit according to claim 5, wherein the sub-slide portions are disposed at two portions, and
the sub-slide portions at the two portions are disposed in positions substantially opposed to each other.

7. The vehicular display unit according to claim 5, wherein the second display is disposed on a side face of the first display,
a support portion of the second display is inserted into the first display from a slide slit on the side face of the first display, and
the gear belt and the display guide portion are received in the first display.

* * * * *